(12) United States Patent
Wade

(10) Patent No.: US 10,837,528 B2
(45) Date of Patent: Nov. 17, 2020

(54) LINE STRAINER

(71) Applicant: Gallagher Group Limited, Hamilton (NZ)

(72) Inventor: Robert Andrew Wade, Hamilton (NZ)

(73) Assignee: GALLAGHER GROUP LIMITED, Hamilton (NZ)

( * ) Notice: Subject to any disclaimer, the term of this patent is extended or adjusted under 35 U.S.C. 154(b) by 69 days.

(21) Appl. No.: 15/749,046

(22) PCT Filed: Jul. 29, 2016

(86) PCT No.: PCT/NZ2016/050121
§ 371 (c)(1),
(2) Date: Jan. 30, 2018

(87) PCT Pub. No.: WO2017/018891
PCT Pub. Date: Feb. 2, 2017

(65) Prior Publication Data
US 2018/0223968 A1     Aug. 9, 2018

(30) Foreign Application Priority Data

Jul. 30, 2015 (NZ) ........................................ 710610

(51) Int. Cl.
*F16H 7/08* (2006.01)
*F16G 11/12* (2006.01)
(Continued)

(52) U.S. Cl.
CPC .......... *F16H 7/0848* (2013.01); *A01K 3/005* (2013.01); *E04H 17/06* (2013.01); *F16G 11/12* (2013.01);
(Continued)

(58) Field of Classification Search
CPC ........... F16H 7/0848; F16H 2007/0855; H04B 17/14; A01K 3/005; E04H 17/04;
(Continued)

(56) References Cited

U.S. PATENT DOCUMENTS

| | | | | |
|---|---|---|---|---|
| 4,078,771 A | * | 3/1978 | Diggs | A01K 3/005 174/45 TD |
| 4,090,472 A | * | 5/1978 | York | A01K 3/005 119/502 |

(Continued)

FOREIGN PATENT DOCUMENTS

| | | | | |
|---|---|---|---|---|
| GB | 191019675 A | * | 3/1911 | ............. F16G 11/12 |
| GB | 1457895 A | | 12/1976 | |
| NZ | 195388 A | | 5/1986 | |

OTHER PUBLICATIONS

PCT, International Search Report dated Oct. 28, 2016 cited in PCT/NZ2016/050121, 3 pages.

*Primary Examiner* — Michael E Gallion
(74) *Attorney, Agent, or Firm* — Moore & Van Allen PLLC; Henry B. Ward, III

(57) ABSTRACT

A line strainer for use in an electric fence system is described. The line strainer includes a unitary body made of electrically non-conductive material, having two opposing arms, a spool mounting element for rotatably mounting an electrically conductive spool having at least one toothed flange between the arms of the body, wherein the spool is configured to have a first line secured to it. The line strainer further includes a line bearing support member about which a second line is to be passed and tensioned. A releasable pawl is attached to the unitary body and configured to engage with the at least one toothed flange to restrict rotation of the spool in one direction when the spool is rotatably mounted to the spool mounting element.

23 Claims, 9 Drawing Sheets

(51) Int. Cl.
*A01K 3/00* (2006.01)
*E04H 17/06* (2006.01)
*H04B 17/14* (2015.01)
*B21F 9/00* (2006.01)
*E04H 17/04* (2006.01)
*E04H 17/08* (2006.01)

(52) U.S. Cl.
CPC .............. *H04B 17/14* (2015.01); *B21F 9/002* (2013.01); *E04H 17/04* (2013.01); *E04H 17/08* (2013.01); *F16H 2007/0855* (2013.01)

(58) Field of Classification Search
CPC ......... E04H 17/06; E04H 17/08; F16G 11/12; B60P 7/083; B60P 7/0846
See application file for complete search history.

(56) References Cited

U.S. PATENT DOCUMENTS

| | | | | |
|---|---|---|---|---|
| 4,445,669 A | * | 5/1984 | Wilson | B66D 3/14 242/118.61 |
| 4,973,029 A | * | 11/1990 | Robbins, III | A01K 3/005 174/120 SC |
| 6,062,157 A | * | 5/2000 | Derman | B63B 21/04 114/213 |
| 8,172,203 B2 | * | 5/2012 | Chou | B60P 7/0846 242/388.4 |
| 9,284,746 B2 | * | 3/2016 | Robbins, III | E04H 17/266 |
| 9,820,446 B2 | * | 11/2017 | Parrish | A01G 22/00 |
| 2001/0045554 A1 | * | 11/2001 | Pulliam | A01K 3/00 256/65.14 |
| 2002/0063247 A1 | * | 5/2002 | Terzaghi | F16G 11/12 254/222 |
| 2002/0153518 A1 | * | 10/2002 | Huang | B60P 7/083 254/223 |
| 2003/0218162 A1 | * | 11/2003 | Tackett | B65H 75/22 256/68 |
| 2005/0041363 A1 | | 2/2005 | Reid | |
| 2010/0008011 A1 | * | 1/2010 | Ogram | H01Q 1/28 361/222 |
| 2010/0051887 A1 | * | 3/2010 | Wooster | B21F 9/00 254/217 |
| 2011/0253956 A1 | * | 10/2011 | Smetz | F16G 3/006 254/100 |
| 2012/0138883 A1 | * | 6/2012 | Gallagher | A01K 3/00 256/47 |
| 2012/0298942 A1 | * | 11/2012 | Tyrrell | A01K 3/00 256/10 |
| 2017/0303643 A1 | * | 10/2017 | Converse | A43C 11/165 |

* cited by examiner

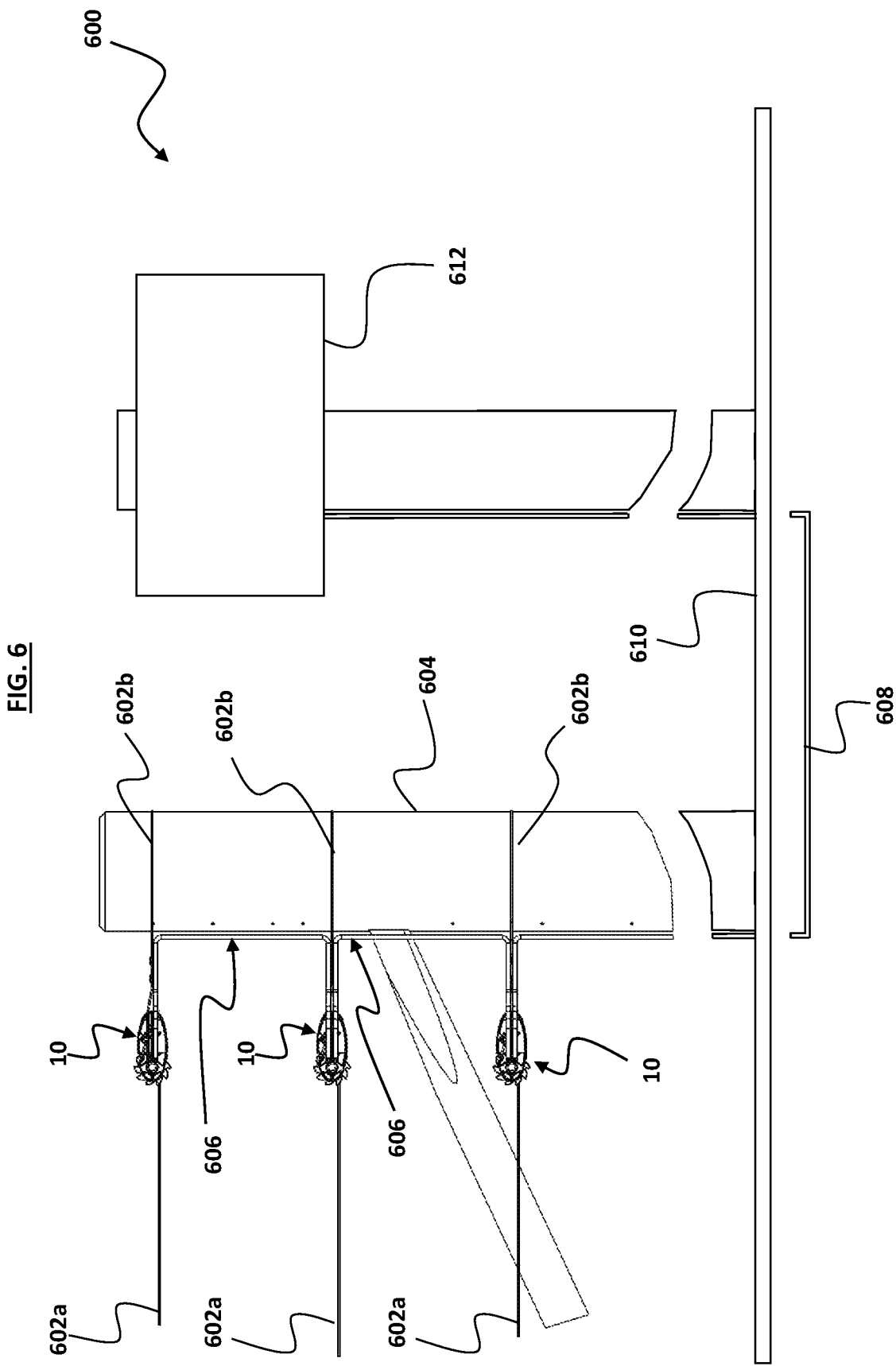

LINE STRAINER

TECHNICAL FIELD

The invention relates to a line strainer for use in fencing. The line strainer may have particular application to electric fencing.

STATEMENT OF CORRESPONDING APPLICATIONS

This application is based on the specification filed in relation to New Zealand Patent Application No. 710610, the entire contents of which are incorporated herein by reference.

BACKGROUND

The use of electric fencing is common for a number of industries, where a current is applied to a fence line to provide an electric shock to any objects that come in contact with it. The application is especially useful for the use of controlling movement of livestock.

Typically, electric fencing is set up by having a plurality of posts along a fence line with fencing wire (reference to which should be appreciated to include other filamentous barrier members such as conductive tape) connecting the posts. The fencing wire is also conductively connected to energisers which provide the electrical current passing through the wire.

Such fences may extend in networks in the order of kilometers in length—requiring a substantial amount of labour (and therefore cost) to install and maintain. As a result, there are a wide range of products, such as connectors and brackets, available to allow the user to securely, safely, and quickly attach fencing wire and other accessories (such as energisers) to posts, fencing standards or any other object to which the fencing wire is to be secured. Given the labour intensive nature of installing and maintaining electric fencing networks, any improvements which lead to operational advantages such as reduction in the time and effort required to establish a robust fencing line are considered to be particularly advantageous.

Two common requirements of such electric fence networks is that the wire be taut in order to maintain its effectiveness as an animal barrier, and that an insulator be positioned between the wire and the end post to which the wire is anchored in order to avoid short circuiting of the wire through the post.

Ratcheted tensioners are known for installation in the fence line to provide the ability to tension the fence—whether during installation or maintenance. Such tensioners commonly mount a spindle having a gear to a frame on which a pawl is positioned in order to provide the ratchet mechanism. The frame is typically made of steel in order to achieve desired strength properties—and conductive as a result.

This necessitates connection of the fence wire to the ratchet mechanism at one end, a length of wire from the other end of the tensioner to an insulator, and a further connection (often another length of wire) between the insulator and the end post. Installation of such an arrangement is labour intensive.

More recently, tensioners have been developed in which an insulator is permanently secured to the conductive frame at the opposite end to the ratchet mechanism—for example through the insertion of metal pins through the frame and insulator.

While reducing the complexity of installation, there remains scope for improvement. Known techniques used to secure the insulator to the frame creates interfaces between insulating materials (whether plastics or ceramics based) of the insulator and the metal of the frame.

One potential issue with this arrangement is the distance between the point of connection to the wire and the metal frame needed to be sufficient to avoid the likelihood of electrical breakdown (i.e. tracking) occurring to produce a conductive pathway between the line connected to the insulator and the metal frame. The resulting size—particularly thickness—of the insulator introduces a higher likelihood of voids being produced during manufacture.

The failure load of 2.5 mm high tensile fencing wire can be in excess of 600 kgf, with the strainer required to maintain at least a third of the failure load of the wire. However, in practice there are little controls on how much tension the fence installer applies to the wire, so there is a possibility the strainer may be subjected to higher loads from time to time. Under this level of tension, the presence of voids may promote the formation of stress cracks.

As well as being generally undesirable for the purposes of structural integrity, such stress cracks can also compromise electrical insulation by producing short tracking paths to metal fasteners between the insulator and conductive frame.

Further, the proximity of voids to the high voltage of the electric fence (for example though the metal frame) can result in a partial discharge beginning within the void. The surrounding insulator material can be eroded as a result, eventually forming a tracking path through the insulating material.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

SUMMARY

According to an exemplary embodiment there is provided a line strainer. The line strainer may include a unitary body made of electrically non-conductive material. The unitary body may include two opposing arms. The unitary body may include a spool mounting element for rotatably mounting an electrically conductive spool having at least one toothed flange between the arms of the body, wherein the spool is configured to have a first line secured to it. The unitary body may include a line bearing support member about which a second line is to be passed and tensioned. The line strainer may include a releasable pawl attached to the unitary body and configured to engage with the at least one toothed flange to restrict rotation of the spool in one direction.

According to another exemplary embodiment there is provided a method of connecting and tensioning a first line and a second line of an electric fence line. The method may include the step of attaching first ends of the first line and the second line to respective anchoring points. The method may include the step of attaching a second end of the first line to a spool of a line strainer substantially as described herein. The method may include the step of attaching a second end of the second line to a line bearing support member of the line strainer. The method may include the step of rotating the spool of the line strainer to tension the first line and the second line.

According to another exemplary embodiment there is provided an electric fence system. The electric fence system may include a first line and a second line, each having a first end and a second end, attached at their first ends to respective anchoring points. The system may include a line strainer substantially as described herein, wherein the second end of the first line is attached to a spool of the line strainer, and the second end of the second line is attached to a line bearing support member of the line strainer.

Reference to a line strainer should be understood to mean a device for connecting and tensioning two or more lines—for example, in a fence line. The line may be any suitable conductor known in the art for electric fencing. For example the line may be wire, and may be referred to as such herein, but it should be appreciated that this is not intended to be limiting.

In an exemplary embodiment the line strainer includes a spool. Reference to spool should be understood to mean a member configured to have material wound about it—particularly wire or conductive tape in the context of fencing. Reference to rotation of the spool should be understood to mean rotation about the longitudinal axis of an axle of the spool.

In an exemplary embodiment, the spool may include an aperture in the axle through which the first line may be passed, and subsequently wound about the axle, in order to assist in securing the line to the spool and reducing the likelihood of the line slipping under tension.

The at least one flange may extend axially from the longitudinal axis of the axle, having teeth around its periphery. The spool may include two such flanges spaced apart from each other along the longitudinal axis of the axle.

In use, wire may be secured to the spool by passing through an aperture in the side of the axle, and then wound about the axle by rotation of the spool. Tension in the wire may bias the teeth against the pawl, preventing rotation of the spool in one direction unless the pawl is released to permit this.

In exemplary embodiment, the spool may be made of an electrically conductive material. It is envisaged that one or more electrically conductive links may be secured to the spool, in order to create an electrical pathway from the line connected to the spool, through the link, to a desired destination (for example, another line above or below in a multi-line fence).

In an exemplary embodiment the line strainer may include a securing mechanism at the first end of the spool, configured to secure an electrically conductive link to an electrically conductive connection to the spool at the first end of the axle. In an exemplary embodiment, the electrically conductive connection may be achieved by the conductive link may being in direct contact with the spool—however it should be appreciated that this is not intended to be limiting, and that an electrically conductive connection may be established via an intermediary component such as a washer.

The conductive link may be any suitable means known in the art for electrically interconnecting fence lines. For example, the conductive link may be a length of wire (whether insulated or bare), or a strip of conductive material.

Reference to a securing mechanism should be understood to be any means or mechanism known to a person skilled in the art for bearing against an object to force it against a bearing surface.

In an exemplary embodiment, the securing mechanism may threadably engage the spool. Reference to threadable engagement should be understood to mean the interaction between two parts in which at least one of the parts includes a helical thread engaging with a surface of the other. In exemplary embodiments, both parts may include complementary threads—one external and one internal—which engage with each other to prevent linear motion without application of external rotational force.

In exemplary embodiments, the securing mechanism may include a threaded fastener configured to be received by a threaded aperture in the first end of the spool. This mechanism is envisaged as providing a mechanically simple means of providing sufficient bearing force to achieve a gas tight connection between the conductive link and electrical pathway to the spool, and holding the conductive link at that point.

Reference to a unitary body should be understood to mean a one-piece structure having a plurality of features manufactured as a single part. It is envisaged that such a structure, made of electrically insulating material, may have a number of effects in the context of a line strainer for an electric fence.

For example, manufacture of the arms and line bearing support member as a single part of electrically insulating material eliminates the metal on insulating material interface between the frame and insulator of the prior art, as well as the use of fasteners therebetween. In addition to reducing complexity of the supply chain and assembly of multiple parts, this may assist in increasing the tracking distance between the tensioned lines, and/or reduce the likelihood of stress cracks forming short tracking paths to the fasteners. It may also reduce the likelihood of corona discharge within voids of plastic material, where the void is between two pieces of conductive material with a high voltage potential difference between them.

In an exemplary embodiment the unitary body may be moulded, but it should be appreciated that other manufacturing techniques—such as subtractive processes (for example, CNC routing) or additive processes (for example, 3D printing)—may be used.

In an exemplary embodiment the body may be made of glass filled nylon. It is considered that this material has properties which may be well suited to the function of a line tensioner—particularly with regard to creep resistance, dielectric properties, tensile strength, flexural strength, and weather resistance.

By way of example, the glass filed nylon may be a 30% glass fibre reinforced injection molding polyamide (PA6 grade) such as the Ultramid® B3EG6 supplied by BASF Corporation. However, it should be appreciated that other electrically non-conductive materials known to those skilled in the art may be used in place of glass filled nylon—for example other fibre reinforced plastics, plastics, or ceramics.

In an exemplary embodiment, the wall thickness of the unitary body made of glass-filled nylon may be 2.5 mm to 6 mm. It is envisaged that maintaining wall thickness within this range may assist in reducing the likelihood of voids forming during manufacture. This exemplary embodiment is envisaged as being particularly suited to use with 2.5 mm high tensile steel wire having an operating tension of substantially 150 kgf and a failure point of substantially 600 kgf—it should be appreciated that a desired wall thickness may be influenced by the intended load bearing capabilities of the line strainer, and material properties.

In an exemplary embodiment, the spool mounting element may include an aperture in each of the arms. This arrangement is common in the prior art, but is envisaged as having particular application in embodiments of the present invention in which it may be desirable to access the spool for the purpose of connecting conductive links, as previously described.

In the journal bearing created by the spool rotating in the apertures, the cross-sectional areas of the arms above and below the apertures are required to carry the full load applied to the strainer. The load is applied through the curved surface of the apertures against which the spool bears when the lines are tensioned, with the cross-sectional areas of the arms resisting the load.

In an exemplary embodiment, an area surrounding the apertures of the spool mounting element may be reinforced. In an exemplary embodiment, the reinforcement may be achieved through the provision of a greater thickness of material in select areas. It may be desirable to reduce the volume of material used in the body in order to keep weight and material costs down as well as reducing the likelihood of voids forming—reinforcing designated areas may assist with achieving this while maintaining necessary structural properties. In the context of the area surrounding the apertures, this may assist in increasing the cross-sectional area to achieve the necessary load bearing capabilities.

There may also be some compressive stress in the arm at the point of the spool bearing against the aperture, and the additional width of the arm resulting from the reinforcing may help spread this load more evenly.

It should be appreciated that this is not intended to be limiting, and other manufacturing techniques may be used to achieve the desired load bearing capabilities. In an exemplary embodiment, a skeleton frame of high strength material may be overmolded with an outer layer of a different material. For example, the outer layer may include features such as the shield and/or link restraints described below which do not need to be made of the higher strength (and potentially more expensive) material.

In an exemplary embodiment, the respective reinforced areas surrounding each aperture may extend between at least two edges of the respective arms.

In an exemplary embodiment, the distance between the surface of the line bearing support member against which the line bears against in use to an element of the line strainer conductively connected to the first line may be at least 32 mm. In doing so, the likelihood of tracking between the first and second lines may be reduced.

It should be appreciated that the minimum distance may be dependent on the output of the energiser the line strainer is intended for use with. By way of example, in a long highly conductive fence line higher voltages than that output in a single pulse from an energiser may result from a return pulse synching with a new pulse (thereby doubling peak voltage). In the case of an 8 KV pulse output, this may result in a peak of 16 KV. Approximating the surface tracking of plastic materials at about 0.5 KV/mm results in the minimum 32 mm tracking distance being required. However, it is envisaged that the unitary body of the present application may enable a tracking distance of greater than 45 mm to be achieved without the overall dimensions of the line strainer substantially varying from existing line strainers.

In an exemplary embodiment, an aperture may pass through the unitary body at a point distal from the spool mounting element, with the material between the aperture and an end of the body forming the line bearing support member.

In an exemplary embodiment, the unitary body includes a shield located between the line bearing support member and the space between the arms. It is envisaged that the shield may assist in increasing creepage distance over the surface of the unitary body to reduce the likelihood of electrical breakdown (i.e. tracking) occurring and leading to short-circuiting between the first and second lines.

In an exemplary embodiment, the unitary body may be reinforced along the length of the body to resist strain. For example, the unitary body may include one or more reinforcing ribs along the length of the body.

In an exemplary embodiment the at least one reinforcing rib may extend along the unitary body between the spool mounting element and the line bearing support member in an orientation substantially parallel to a tensile axis of the unitary body.

A tensile axis extends the length of the body, between the line bearing support member and the spool mounting element. Reference to a tensile axis should be understood to mean the axis along which tensile loads are predominantly applied to the body. In use, as the first and second lines are tensioned, stress is concentrated at the points of connection to the unitary body (i.e. the spool mounting element and the line bearing support member. It is envisaged that in embodiments in which one of the lines is wrapped around the spool, and is therefore offset from a longitudinal axis of the line strainer, the tensile axis in turn may not be collinear with the longitudinal axis.

In exemplary embodiments, the reinforcing of the unitary body—for example the one or more reinforcing ribs—may extend along the unitary body between the spool mounting element and the line bearing support member in an orientation substantially parallel to a longitudinal axis of the unitary body. While in embodiments the longitudinal axis may not be collinear with the tensile axis (where the predominant force vector of the tensile forces will be applied), reinforcing in this arrangement may be sufficient to achieve the required load bearing capabilities.

In an exemplary embodiment, the reinforcing ribs may extend along the outside surfaces of the arms between the reinforcing areas surrounding the apertures and the line bearing support member.

It is envisaged that the linking of load bearing regions with the ribs may assist in achieving the necessary tensile strength requirements for the unitary body. The ribs may also assist to increase the strength of the arms to resist flexing outwardly when wire tension is applied.

In embodiments in which the arms are substantially planar, reinforcing may be provided along edges of the arms. In addition to improving load bearing capabilities of the body in general, this may assist in improving stiffness of the arms for the above reasons.

In an exemplary embodiment, the surface of the unitary body may be ramped between a base level and a top level of at least one section of the reinforcing. Reference to the surface being ramped should be understood to mean that the surface is sloped along the rise or fall of the reinforcing—whether than be a linear transition or curved.

It is envisaged that this may assist in reducing the likelihood of water being retained, which might otherwise act as a short circuit—or at least reduce the effective tracking distance across the surface of the body. The ramping is envisaged as assisting in having gravitational force overcome the adhesion force between the water and the surface of the body.

In an exemplary embodiment, the ramping may be located along the upper edge of one of the reinforcing ribs. While it should be appreciated that this is not intended to be limiting, it is envisaged that ramping on a single rib may act as a canopy for recesses below it—with water shedding off the top rib rather than becoming trapped.

In an exemplary embodiment the strainer may include at least one drainage hole passing through the body. In an exemplary embodiment the at least one drainage hole may be positioned in a recess formed between two sections of reinforcing—for example between two reinforcing ribs. Reference to a releasable pawl should be understood to mean a pawl which may be moved out of engagement with the toothed flange to allow free rotation of the spool in either direction. In embodiments, the pawl may be of a configuration well known in the art—for example a bolt sliding along a slotted path, or a pivoting bar.

In exemplary embodiments the pawl may biased to act against the flange unless force is applied by a user to hold it away.

In an exemplary embodiment the pawl may be an over-centre device, whereby when the pawl is on one side of a centre of rotation it is biased against the toothed flange and when it is on the other side of the centre of rotation it is biased away from the toothed flange (for example against the arms of the body).

In an exemplary embodiment, the pawl may include a sprung member integral with the unitary body, and a spool engaging member connected to the sprung member for engaging with the spool. For example, the sprung member may be moulded as one piece with the body.

It is envisaged that this arrangement may assist in maintaining a desired tracking distance between the line bearing support member and the wire attached to the spool. In comparison, pawls in which conductive components connect to, or through, the body at points closer to the line bearing support member may present a shorter electrically conductive pathway.

In an exemplary embodiment the sprung member may be biased towards the spool. It is envisaged that this bias may be achieved by way of elastic flexure of the sprung member and the connection between the sprung member and the body—permitting movement of the sprung member away from the spool under load, and returning to its original opposition when released by virtue of its elasticity.

In an exemplary embodiment the spool engaging member may be a shaft extending across the body between the arms, and arranged to be positioned between the teeth of the spool, and also bear against the arms of the body to prevent rotation of the spool. In another exemplary embodiment, the spool engaging member may include one or more lugs extending from the sprung member to perform the same function.

In an exemplary embodiment the spool engaging member may be made of a different material to the sprung member. For example, where the unitary body and the sprung member are made of a plastics material, the spool engaging member may be a metal pin extending through the sprung member.

In an exemplary embodiment, the pawl may include a releasable catch adapted to selectively hold the sprung member in a position away from the spool. For example, the releasable catch may include a protrusion having a lip on which a catch surface of the sprung member is seated, until the releasable catch is withdrawn or the sprung member pushed forward.

In an exemplary embodiment the releasable catch may also be integral with the unitary body. The releasable catch may be biased towards a position away from the spool, to resist the bias of the sprung member while engaged, and still permit flexural movement towards the spool to assist with engagement (or release) of the sprung member.

In an exemplary embodiment the line strainer may include at least one link restraint. A link restraint should be understood to be a means for controlling the position of a conductive link relative to the body.

According to an exemplary embodiment there is provided a line strainer. The line strainer may include a body. The body may include two opposing arms. The body may include a spool mounting element for rotatably mounting a spool having at least one toothed flange between the arms of the body, wherein the spool is configured to have a first line secured to it. The body may include at least one link restraint for controlling the position of a conductive link relative to the body. The line strainer may include a releasable pawl attached to the body and configured to engage with the at least one toothed flange to restrict rotation of the spool in one direction.

Where conductive links are to be secured to one of the lines, or the line strainer (for example using the previously described securing mechanism), it may be desirable to secure the link in a desired orientation. This may be useful from a functional perspective—assisting with holding the link in place while a conductive portion is secured, or reducing the likelihood of the links being dislodged—as well as being tidy and aesthetically pleasing.

In an exemplary embodiment, the at least one link restraint may be a projection extending from the body. Multiple projections may be provided, spaced apart such that conductive links such as insulated wire cable may be inserted there between and held in place in a desired orientation.

In an exemplary embodiment, at least one of the link restraint projections may include a lip at an end distal from the body. The lip may act as a clip to assist in retaining the conductive link, and prevent lifting. In an exemplary embodiment, such a lip may be produced using an undercut in the mold.

In an exemplary embodiment the at least one link restraint may include a primary link restraint projection and a secondary link restraint projection, spaced apart such that a conductive link may be positioned between them.

In an exemplary embodiment, the secondary link restraint projection may have a greater degree of resilient flexure than the primary link restraint projection. This may assist in holding the conductive link in place, and also accommodating different sized links In an exemplary embodiment the link restraint may define at least one enclosed passage. For example, the link restraint may include one or more arches, which when the link restraint is attached to the body define one or more enclosed passages in conjunction with the surface of the body.

In an exemplary embodiment the link restraint may be releasably attached to the body by engaging with at least one attachment point of the body. For example, the body may include at least one recess configured to receive an end of the link restraint. The connection may be a bayonet clip type, in which the end of the link includes a barb for clipping to a lip of the recess. It should be appreciated that this is not intended to be limiting, and that any suitable means known to a person skilled in the art may be used to attach the link restraint to the body.

It is envisaged that the body may include multiple sets of attachment points in different orientations. For example, the body may include a set of recesses for receiving a link restraint to secure a conductive link in an orientation perpendicular to the arms, as well as a set of recesses for receiving a link restraint to secure a conductive link in an orientation along the length of the arms.

BRIEF DESCRIPTION OF THE DRAWINGS

Further aspects of the present invention will become apparent from the ensuing description which is given by way of example only and with reference to the accompanying drawings in which:

FIG. 6 is a side view of an exemplary electric fence system.

DETAILED DESCRIPTION

Figure 1A:
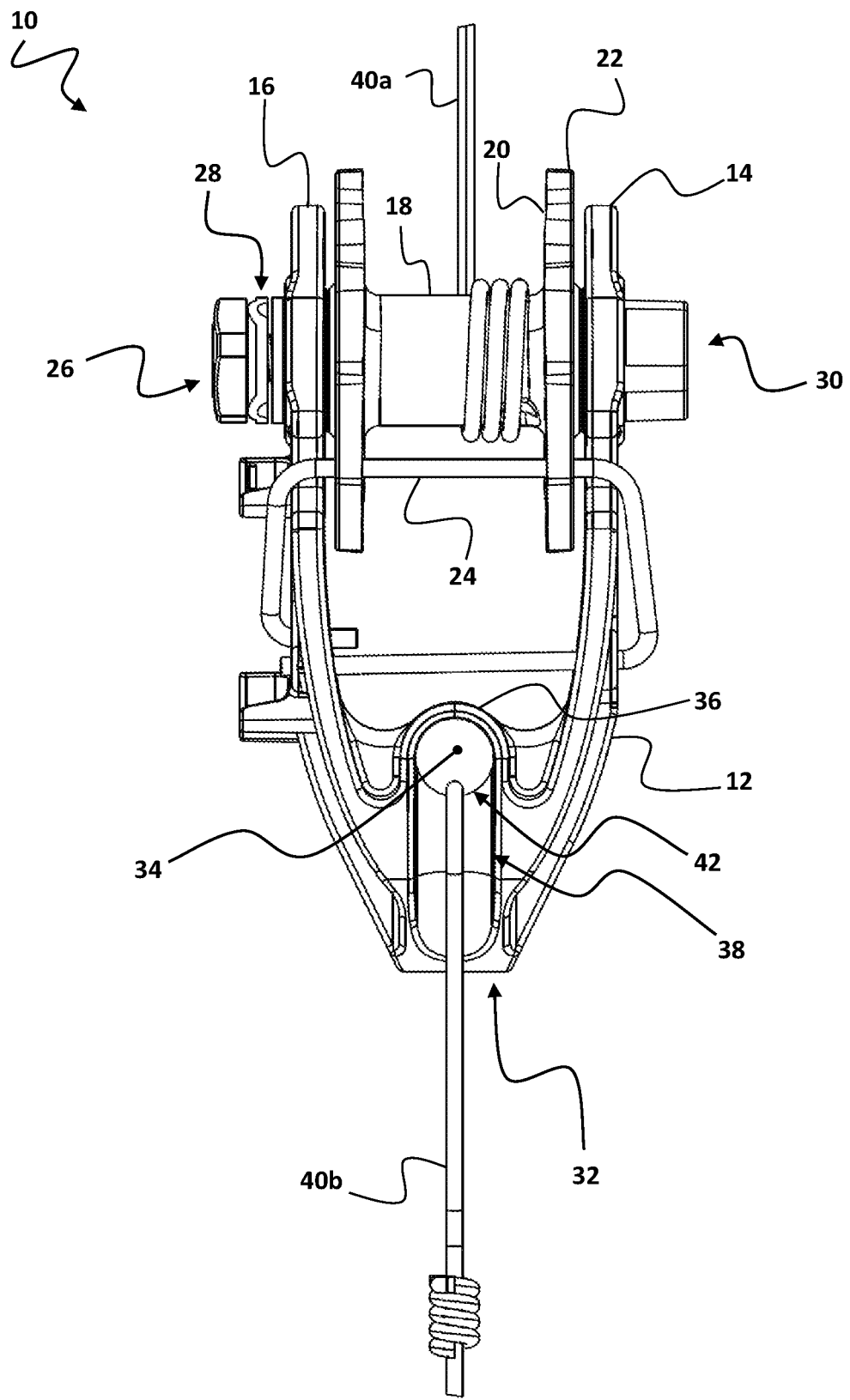
FIG. 1A is a top view of an exemplary line strainer according to one embodiment.

FIG. 1A illustrates a line strainer (generally indicated by arrow 10) including a unitary body in the form of an open armed bracket 12 having a first planar arm 14 and a second planar arm 16. A spool 18 is positioned between the first arm 14 and second arm 16, located in apertures in each arm (the apertures are not clearly shown in FIG. 1A, but are described below with reference to FIG. 1C) such that the spool 18 is able to rotate about its longitudinal axis. The spool 18 is manufactured as a unitary part out of cast aluminium—although it should be appreciated that the spool 18 may be manufactured of any suitably conductive material known in the art. The spool may even be moulded of a conductive plastic material or in some cases non-conductive plastic material where interconnectivity between the spool and another part of the electric fence is not required.

The spool 18 includes flanges 20, each having a plurality of angled teeth 22. The teeth 22 are configured to catch on a pawl 24 of the line strainer 10—also illustrated in FIG. 1B.

Figure 2A:
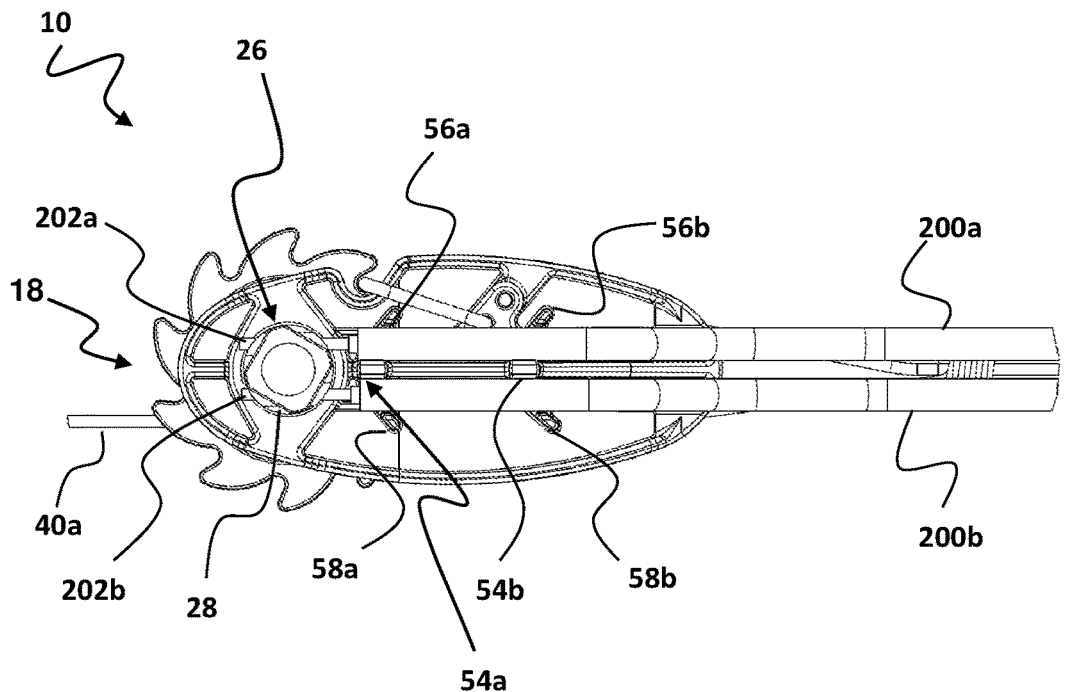
FIG. 2A is a side view of an exemplary line strainer used to secure two conductive links.
Figure 2B:
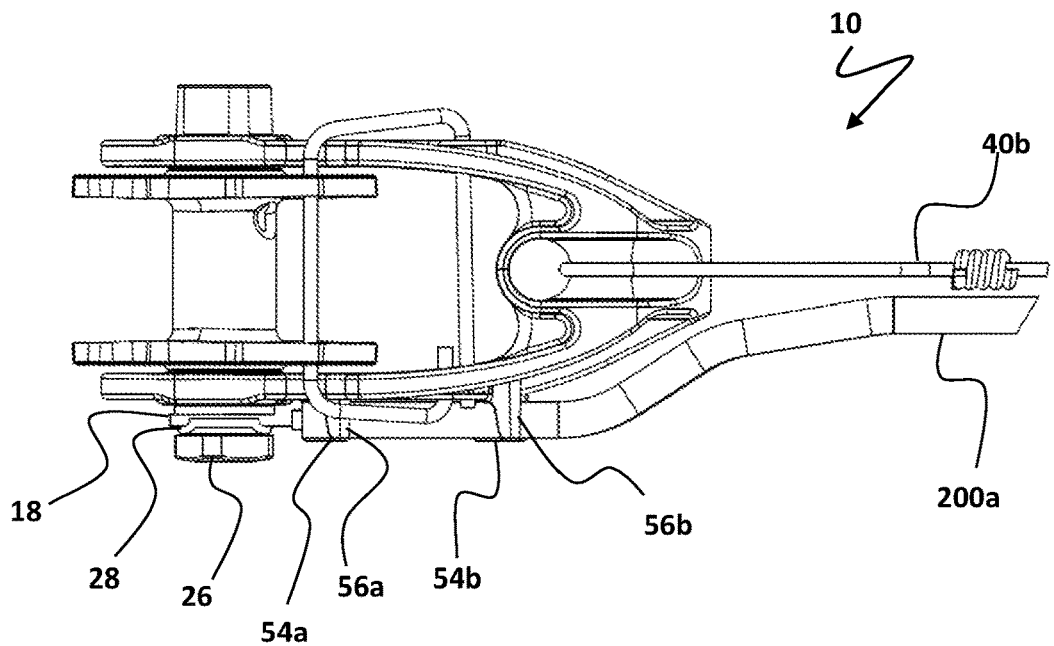
FIG. 2B is a top view of the exemplary line strainer securing the links.
Figure 2C:
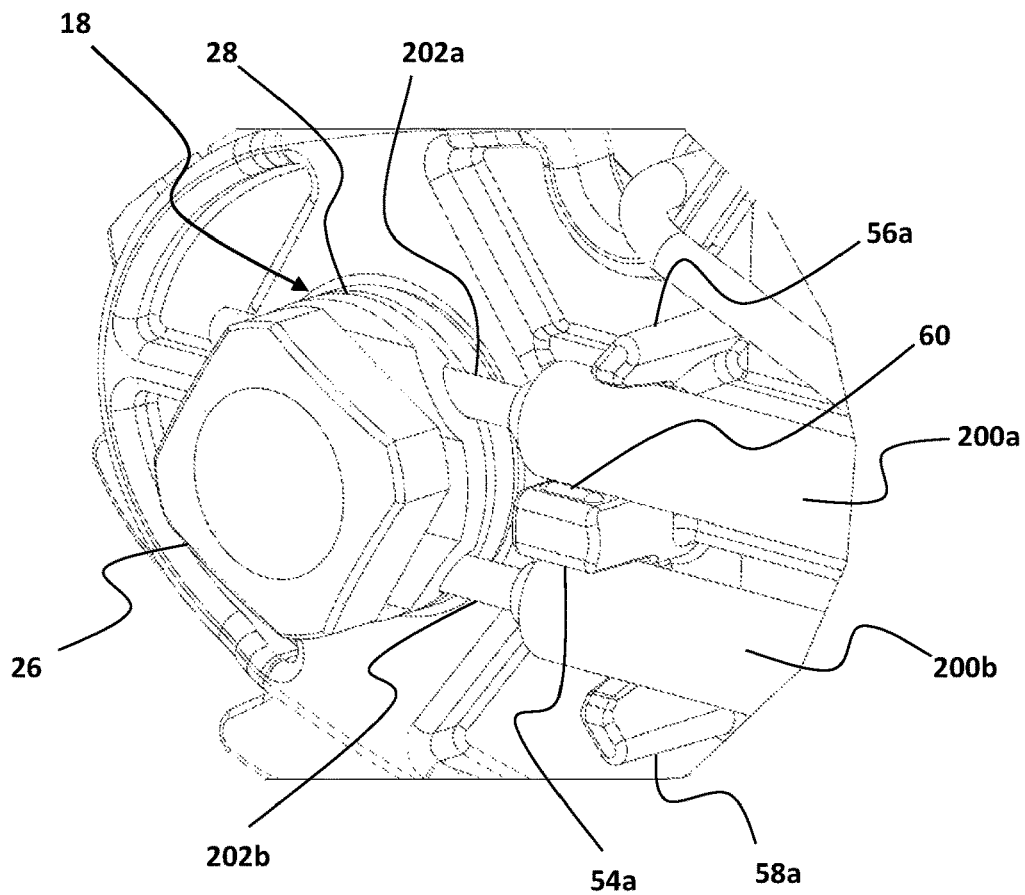
FIG. 2C is an enlarged perspective view of the securing mechanism of the exemplary line strainer.

Returning to FIG. 1A, the line strainer 10 includes a securing mechanism in the form of a bolt 26 threadably engaged with the spool 18, and configured to tighten a washer 28 against conductive links in the form of wires (exemplary wires are illustrated in, and further described in relation to, FIG. 2A, FIG. 2B, and FIG. 2C) to bear them against the end of the spool 18.

A tool engaging portion 30 is positioned at the second end of the spool 18, distal from the bolt 26. The tool engaging portion 30 facilitates application of a tool such as a spanner (not illustrated) to the spool 18 in order to rotate it relative to the bracket 12. It also functions to prevent rotation of the spool 18 when the bolt 26 is being tightened to secure a link between the washers 28 and the spool 18.

The bracket 12 also includes a line bearing support member 32 at its distal end relative to the spool 18. The support member 32 is formed by an aperture 34 through the bracket 12 at a perpendicular angle to the longitudinal axis of the spool 18.

A shield 36 is formed between the support member 32 and the space between the arms 14 and 16, to increase the creepage distance across the surface of the bracket 12 between the support member 32 and conductive parts, such as: the spool 18, wire 40a surrounding the spool, the pawl 24, and the securing bolt 26.

The support member 32 also includes channels (only channel 38 is shown) leading from the aperture 34 to the end of the bracket 12 distal from the spool 18.

In use, a first line in the form of conductive wire 40a is secured to the spool 18. A second line in the form of conductive wire 40b is passed through the aperture 34, and twisted about itself to form a loop encircling the support member 32. The distal end of the second wire 40b is secured (for example to a post), and the spool 18 rotated to tension the first and second wires 40a and 40b.

The shape of aperture 34 means that when tensioned, the second wire 40b is drawn to a position on the bearing surface 42 centralised relative to the width of the bracket 12, to assist in distributing force between the arms 14 and 16.

Figure 1B:
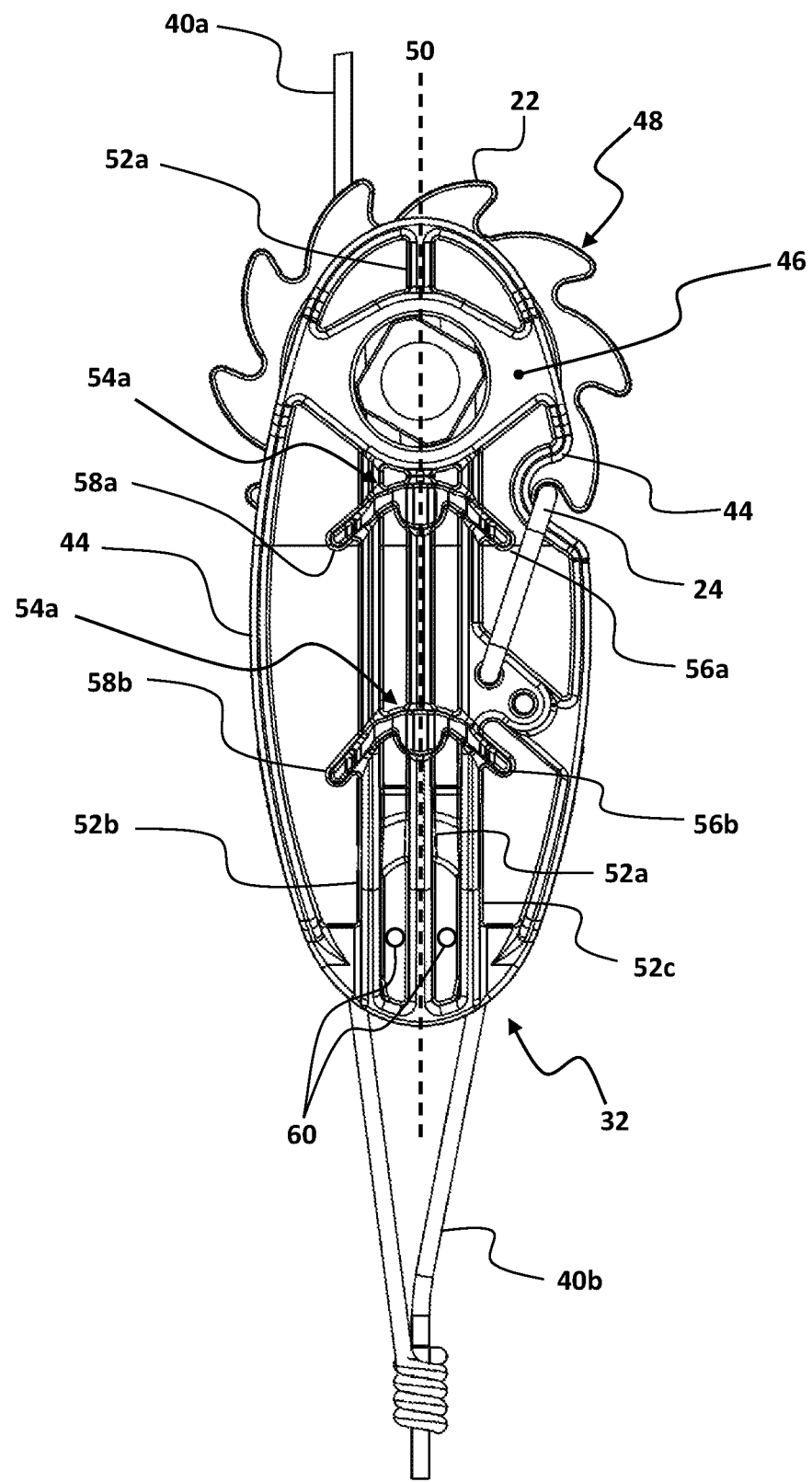
FIG. 1B is a side view of the exemplary line strainer.

Referring to FIG. 1B, reinforcing ribs 44 extend around the edge of the arms to assist in achieving necessary rigidity and load bearing capabilities of the bracket 12. Spool reinforcing area 46 surrounds the apertures 48a and 48b (the apertures 48a and 48b are not illustrated in FIG. 1B, but may be seen in FIG. 1C) in which the spool 18 is mounted, and extends between the edges 44 above and below a longitudinal axis 50 of the strainer 10.

In an exemplary embodiment, in which the bracket 12 is made of glass filled nylon, the reinforcing may be in the order of 6 mm in cross-sectional thickness, compared with a thickness of substantially 2.5 mm in the other areas of the arms 14 and 16.

In this exemplary embodiment, a central reinforcing rib 52a extend the length of the bracket 12 along the outer faces of the arms 14 and 16, substantially parallel with the longitudinal axis 50. Parallel reinforcing ribs 52b and 52c extend between the spool reinforcing area 46 and the support member 32.

Figure 1C:
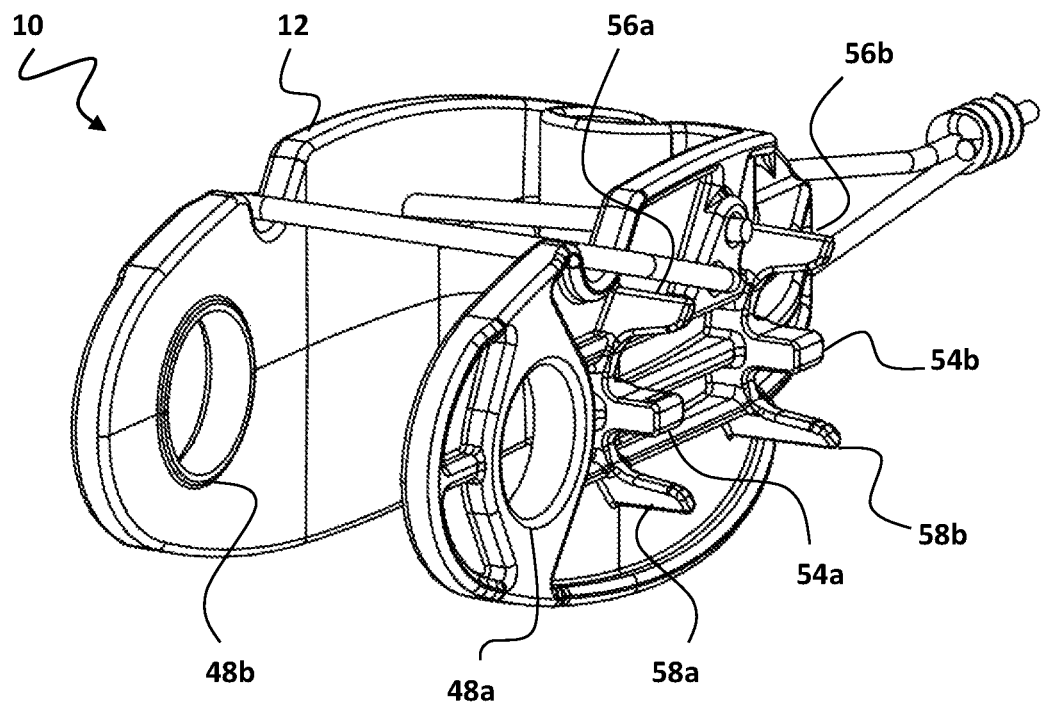
FIG. 1C is perspective view of the unitary body of the exemplary line strainer.
Figure 1D:
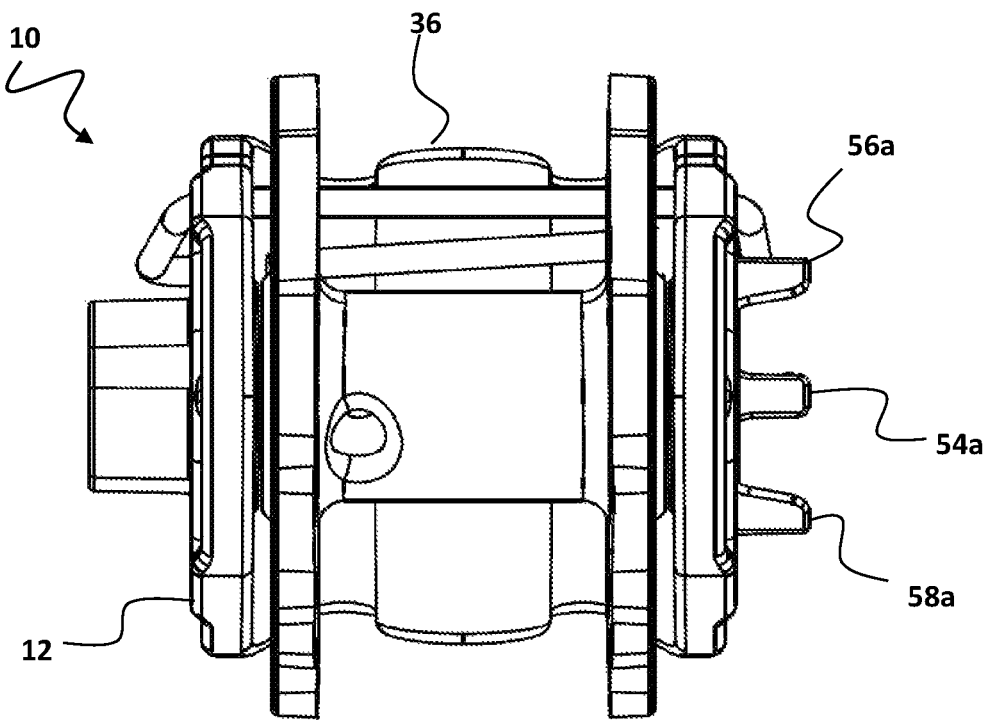
FIG. 1D is an end view of the exemplary line strainer.

The bracket 12 also includes a plurality of link restraints in the form of central restraint projections 54a and 54b extending from the bracket 12, upper restraint projections 56*a* and 56*b* positioned above the respective central restraint projections 54*a* and 54*b*, and lower restraint projections 58*a* and 58*b* positioned below the respective central restraint projections 54*a* and 54*b*. FIG. 1C and FIG. 1D provide additional perspectives of the restraint projections 54*a*, 54*b*, 56*a*, 56*b*, 58*a*, 58*b*.

Drainage holes 60 are positioned between the reinforcing ribs 52*a*, 52*b*, and 52*c* and extend through the bracket 12. The drainage holes 60 may reduce the likelihood of water pooling between the reinforcing ribs 52*a*, 52*b*, and 52*c* (which could otherwise decrease the effective tracking distance across the surface of the bracket 12)—particularly where the line strainer 10 is installed at an angle.

Referring to FIG. 2A, FIG. 2B, and FIG. 2C, conductive links in the form of first and second insulated cables 200*a* and 200*b* are secured to the strainer 10.

The first insulated cable 200*a* is clipped into an upper cable pathway between the central restraint projections 54*a* and 54*b* and upper restraint projections 56*a* and 56*b*. The second insulated cable 200*b* is clipped into a lower cable pathway between the central restraint projections 54*a* and 54*b* and lower restraint projections 58*a* and 58*b*.

As shown more clearly in FIG. 2C, exposed sections of conductive cores 202*a* and 202*b* of the respective first and second insulated cables 200*a* and 200*b* are positioned between the washer 28 and against exposed end of the spool 18 (or a second washer in turn bearing against the spool 18), and the bolt 26 tightened to secure the conductive cores 202*a* and 202*b* in place. An electrically conductive connection is thereby established between the first wire 40*a* and the cables 200*a* and 200*b*, which may then be used to interconnect fence lines, or connect to a power source such as an energiser.

FIG. 2C also illustrates a raised lip 60 on the central restraint projection 54*a*, which assists in retaining the cable 200*a* beneath it.

Figure 3:
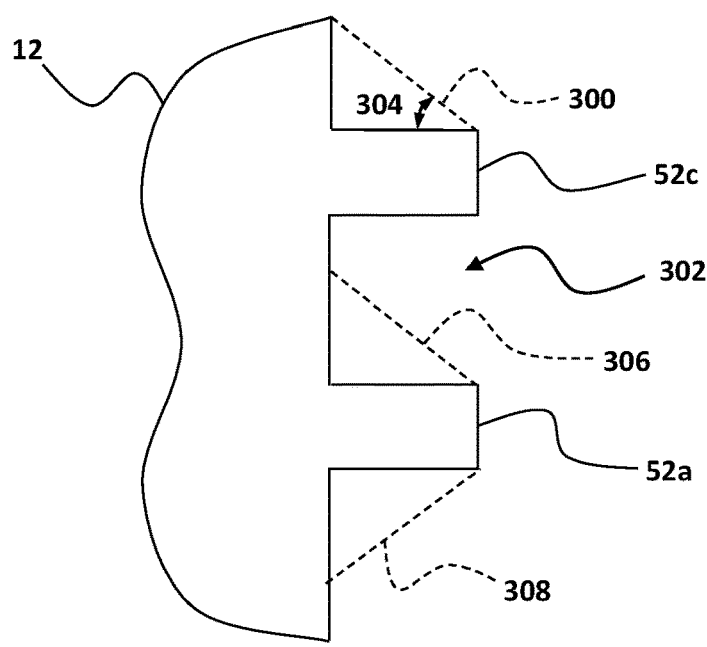
FIG. 3 is a sectional end view of an exemplary line strainer according to another embodiment.

FIG. 3 illustrates embodiments of the bracket 12 in which the reinforcing ribs (ribs 52*c* and 52*a* shown in FIG. 3) are shaped to reduce the likelihood of water collecting in the space between them and creating issues with regard to short circuiting. For example, an upper edge 300 of rib 52*c* may ramp up, directing water over and away from recess 302 between the ribs 52*c* and 52*a* as it runs down the bracket 12.

A person skilled in the art will appreciate that the required angle 304 of the ramp 300 may be somewhat dependent on the properties of the material used to make the bracket 12—particularly with regard to surface energy and its influence on adhesion of water to the bracket 12. The method of manufacture may also play a factor—for example in the case of a moulded bracket 12 the angle may need to account for removal of the bracket 12 from the moulding tool (not illustrated).

In an exemplary embodiment, this angle 304 may be in the order of 5 to 10 degrees. It is envisaged that this may allow for draining in cases where the line strainer is installed in a skewed orientation.

In one embodiment, only edge 300 may be ramped. However, it should be appreciated that this is not intended to be limiting—for example the central rib 52*a* is illustrated as being ramped on both its upper 306 and lower 308 edges.

Figure 4A:
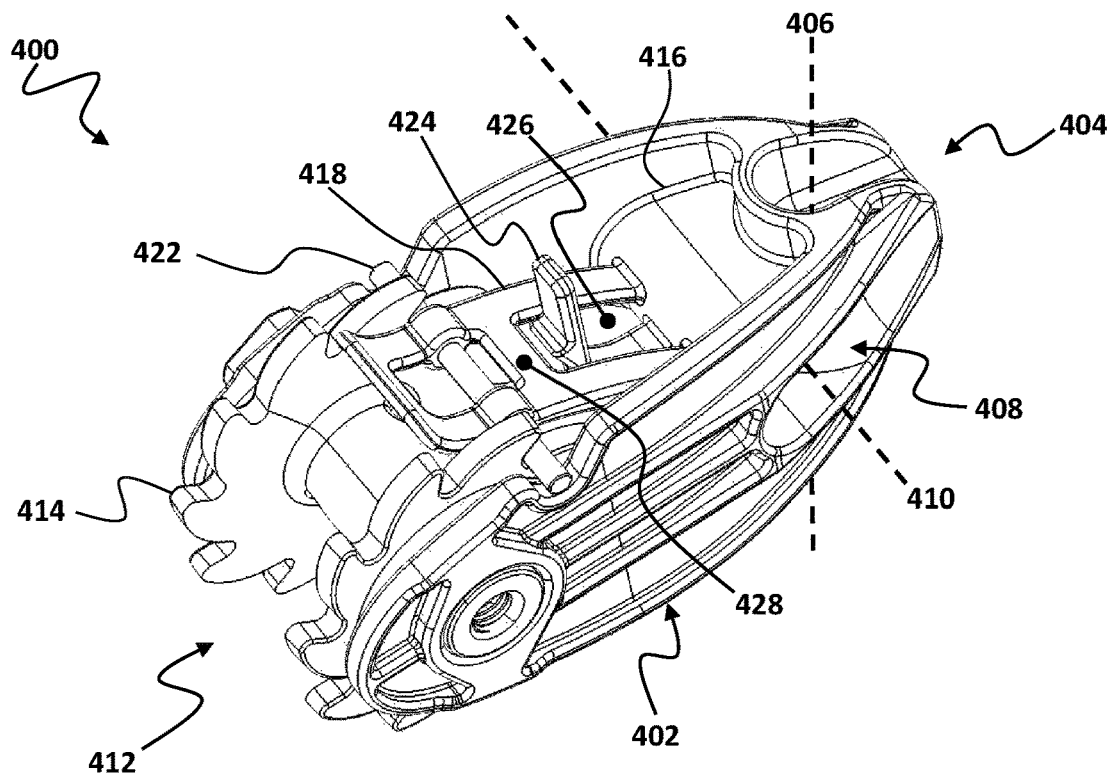
FIG. 4A is a perspective view of an exemplary line strainer according to a further embodiment.

FIG. 4A illustrates another exemplary line strainer 400, having a unitary body in the form of bracket 402 made of an electrically non-conductive material such as glass filled nylon. The bracket 402 includes a line bearing support member 404 in a generally upright orientation aligned with bearing axis 406. The line bearing support member 404 is formed by an aperture 408 passing through the bracket 402 along the aperture axis 410.

A spool 412 including toothed flanges 414 is rotatably mounted to the bracket 402 at the end distal from the line bearing support member 404. A shield wall 416 separates the aperture 408 from the spool 412.

An integrally moulded sprung pawl member 418 extends from the shield wall 416 towards the spool 412. At a position between the shield wall 416 and the distal end 420 of the pawl member 418, a pawl pin 422 is secured to the pawl member 418 to extend laterally and engage with the spool 412 between its teeth and the bracket 402.

In this exemplary embodiment the pawl pin 422 may be made of either galvanized steel or stainless steel to provide sufficient strength to bear the load of the tensioned spool 412, while having a suitable diameter and a low production cost.

The resting position of the pawl member 418 is such that the pin 422 is biased into toothed flanges 414. Flexure of the pawl member 418 allows the pin 422 to ride along the toothed flanges 414 when the spool 412 is rotated anti-clockwise, and resist rotation in the opposite direction by jamming between the toothed flanges 414 and the bracket 402.

A pawl catch member 424 is also integrally moulded with the bracket 402, and extends from the shield wall 416 through a window 426 in the pawl member 418. A brace 428 defines an edge of the window 426 away from the shield wall 416.

Figure 4B:
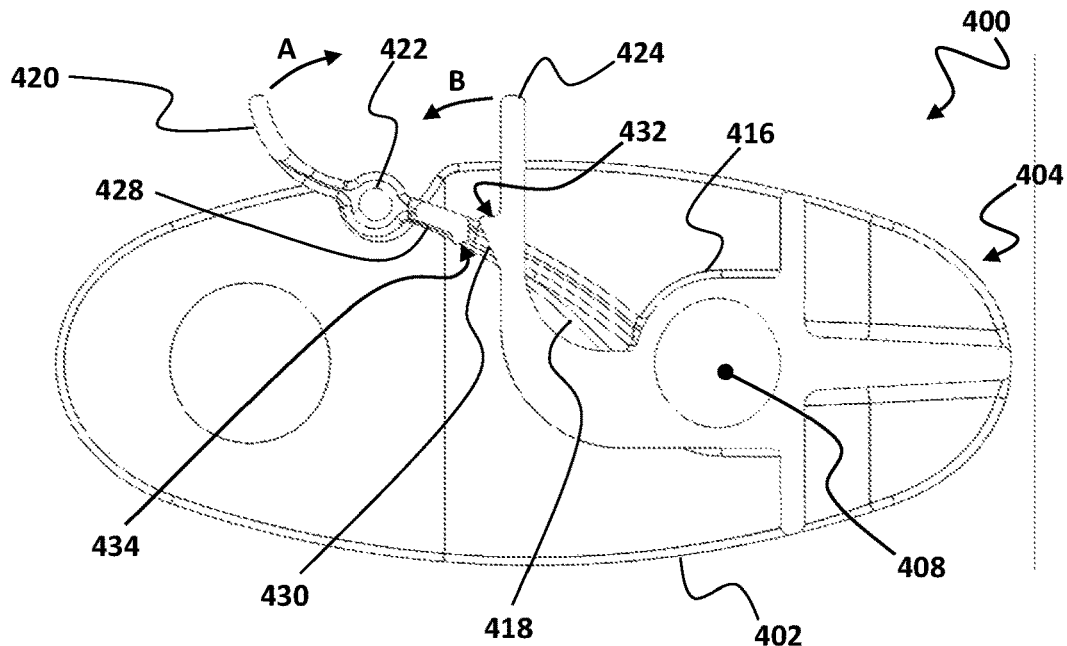
FIG. 4B is a cross-sectional side view of the exemplary line strainer.

Referring to FIG. 4B, the brace 428 of the pawl member 418 includes a downwards facing catch surface 430. The catch member 424 includes a protrusion 430 on the side facing towards the brace 428, the protrusion 430 including an upwards facing lip 432.

In order to hold the pin 422 away from the position shown (so the spool 412 illustrated in FIG. 4A can rotate in a clockwise direction), a user may apply force to the pawl member 418 to move it in the direction A, while applying force to move the catch member 424 in the direction B towards the brace 428. The brace 428 rides over the protrusion 430 such that the catch surface 430 is seated on the lip 432, and is held in place when the user releases the force.

In order to return the pawl member 418 to its resting position, the user may apply a force to the catch member 424 in a direction opposite to direction B, resulting in the catch surface 434 dropping off the lip 432. The natural bias of the pawl member 418 then returns it to its resting position.

Figure 5A:
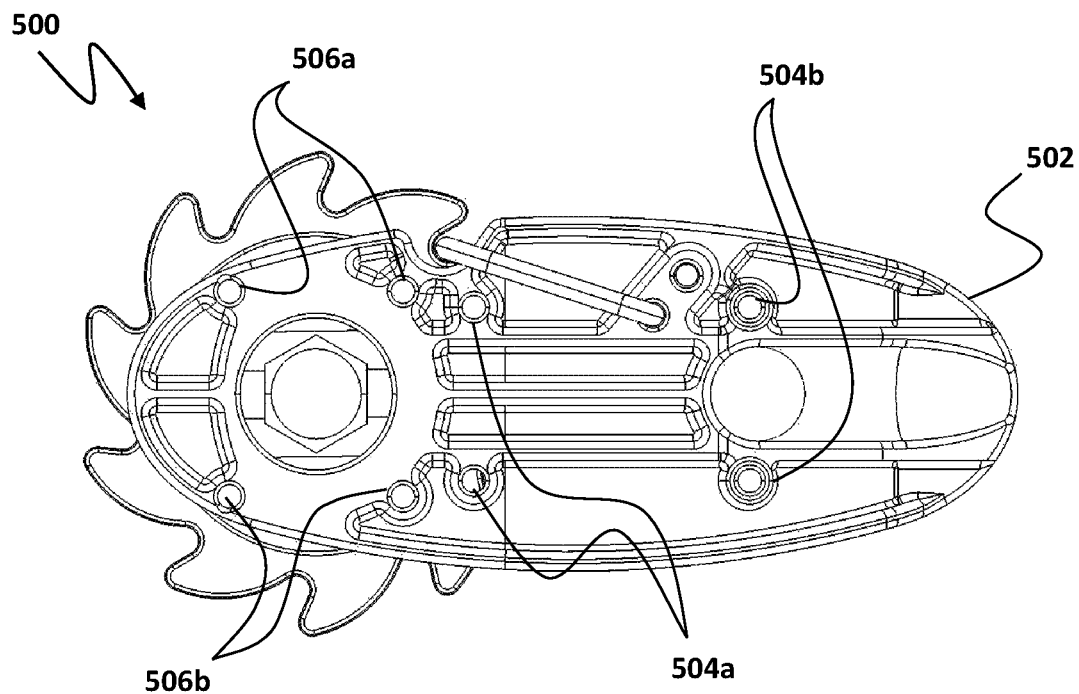
FIG. 5A is a side view of an exemplary line strainer according to an embodiment.

FIG. 5A illustrates an alternative means for securing conductive links relative to a strainer. Strainer 500 includes a bracket 502 generally configured in the manner described with reference to strainer 10 above in terms of having two arms, spool mounting apertures, a spool, and a line support member at a distal end of the bracket to the spool.

However, strainer 500 includes a plurality of recesses, on the face of an arm of the bracket 502. The recesses are grouped in sets, the purpose of which will be described with reference to FIG. 5C and FIG. 5D below. The recesses include first horizontal recesses 504*a* and second horizontal recesses 504*b*, distanced apart along the length of the bracket 502. The recesses also include first vertical recesses 506*a* and second vertical recesses 506*b*, spaced apart, above and below securing mechanism 518 (configured in a similar manner to bolt 26 and washer 28 of the strainer 10).

Figure 5B:
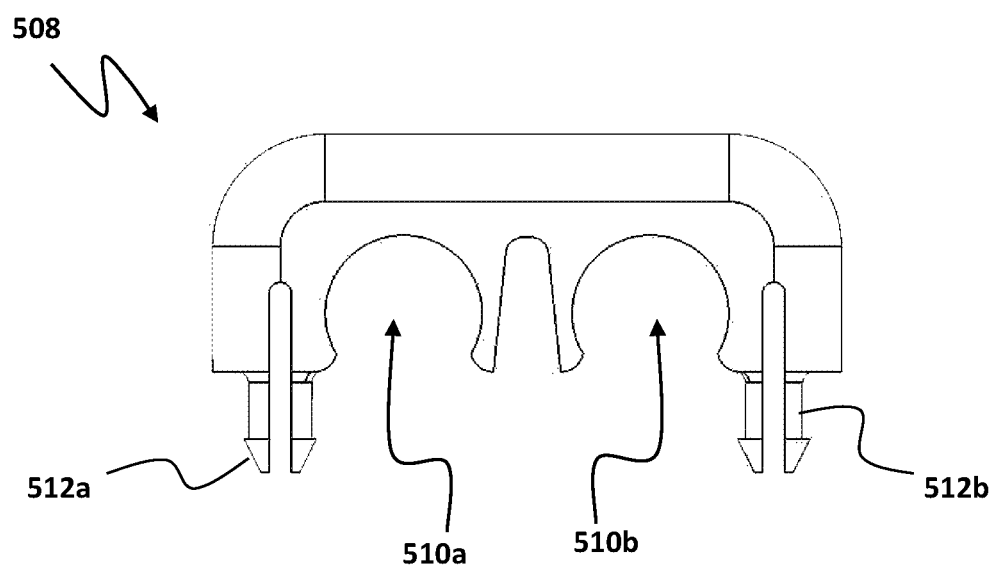
FIG. 5B is a side view of an exemplary removable link restraint for use with the exemplary line strainer.

FIG. 5B illustrates a cable restraint 508. The cable restraint 508 includes first and second arches 510*a* and 510*b*, and first and second bayonet clips 512*a* and 512*b* at each end. The bayonet clips 512a and 512b are configured to fit into the recesses 504a, 504b, 506a and 506b respectively, and releasably secure the restraint 508 to the bracket 502.

Figure 5C:
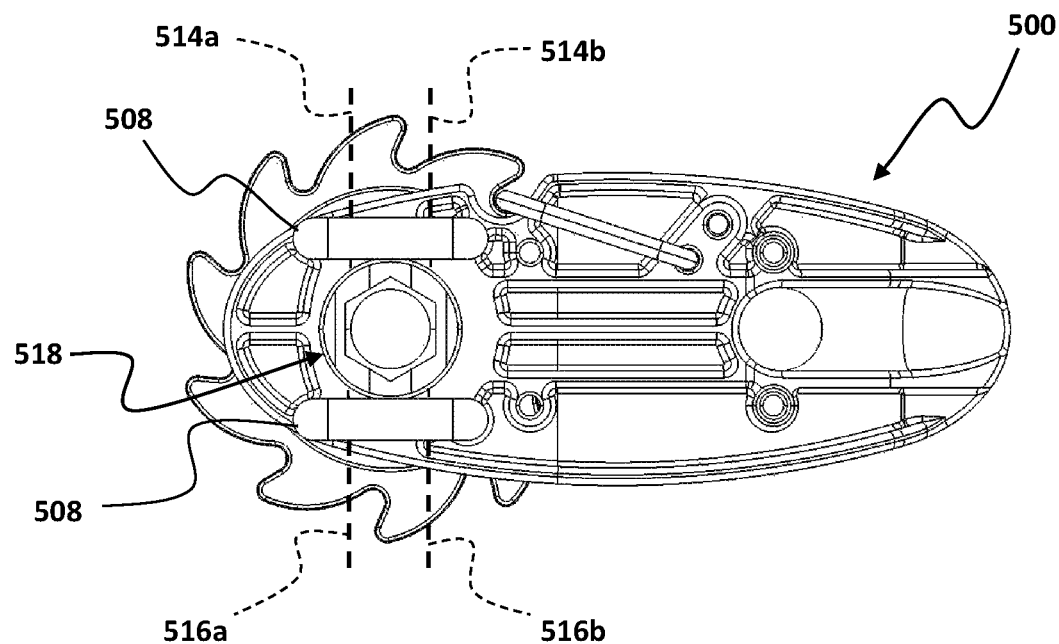
FIG. 5C is a side view of the exemplary line strainer with exemplary removable link restraints attached in a first configuration.

FIG. 5C shows the strainer 500 in which cable restraints 508 are secured to the first vertical recesses 506a and second vertical recesses 506b (recesses 506a and 506b not visible in FIG. 5C, but see FIG. 5A). Cables (not shown) may be secured by the cable restraints 508 to follow any combination of upper vertical cable paths 514a and 514b and lower vertical cable paths 516a and 516b. Exposed ends of the cable(s) may be connected using securing mechanism 518.

Figure 5D:
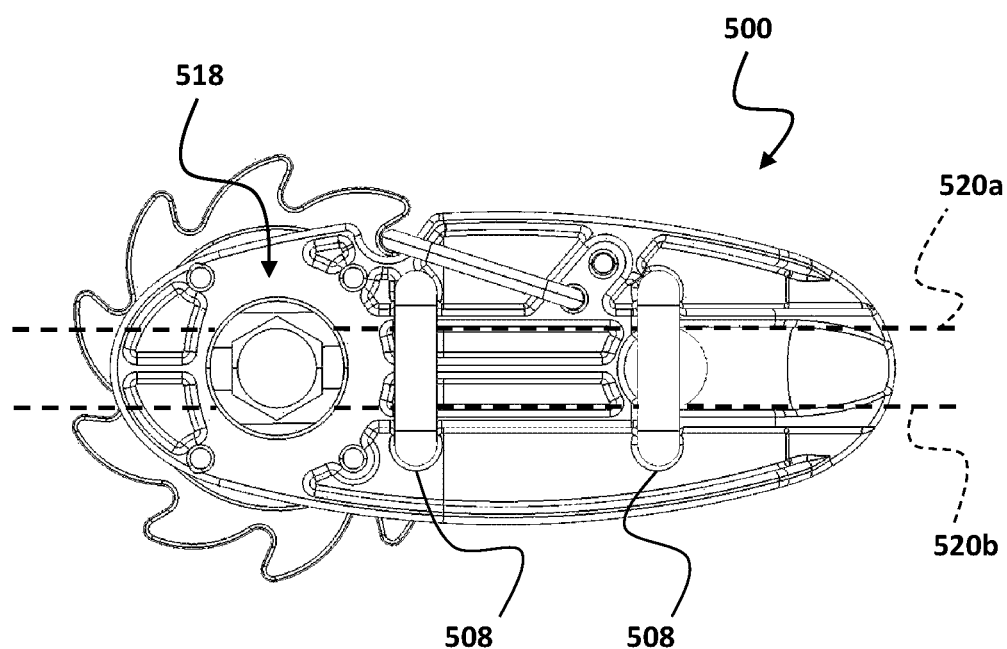
FIG. 5D is a side view of the exemplary line strainer with exemplary removable link restraints attached in a second configuration.

FIG. 5D shows the strainer 500 in which cable restraints 508 are secured to the first horizontal recesses 504a and second horizontal recesses 504b. Cables (not shown) may be secured by the cable restraints 508 to follow upper horizontal cable path 520a or lower horizontal cable path 520b. Exposed ends of the cable(s) may be connected using securing mechanism 518.

FIG. 6 illustrates an exemplary electric fence system 600, including three line strainers 10 configured in the manner illustrated in FIG. 1A connected by their spools to fence wires 602a. Each strainer 10 is also connected to a terminating wire 602b via their support members, the terminating wires 602b in turn secured to post 604. The strainers 10 are operated to tension the wires 602a and 602b to create a fence.

The wires 602a are electrically interconnected by link cables 606 secured to the spools of the strainers 10. A power cable 608 connected to the spool of the lower strainer 10 is run under the ground 610 to an energizer 612. Link cables 606 mean that the electric pulses emitted by the energizer 612 are distributed across all of the wires 602a.

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

Aspects of the present invention have been described by way of example only and it should be appreciated that modifications and additions may be made thereto without departing from the scope thereof as defined in the appended claims.

The invention claimed is:

1. A line strainer, including:
   an electrically conductive spool having at least one toothed flange, wherein the spool is configured to have a first line secured thereto;
   a unitary body made of electrically non-conductive material, including:
     two opposing arms having a space therebetween, wherein each of the opposing arms includes a spool mounting element for rotatably mounting the electrically conductive spool between the opposing arms; and
     a line bearing support member about which a second line is to be passed and tensioned, wherein the line bearing support member includes a curved support surface against which the second line bears in use, wherein the curved support surface is positioned between the two opposing arms, faces towards the electrically conductive spool, and curves away from the electrically conductive spool; and
   a releasable pawl attached to the unitary body and configured to engage with the at least one toothed flange to restrict rotation of the spool in one direction when the spool is rotatably mounted to the spool mounting elements.

2. The line strainer of claim 1, wherein each spool mounting element comprises a spool aperture, wherein an area surrounding each of the spool apertures is reinforced.

3. The line strainer of claim 2, wherein the respective reinforced areas surrounding each spool aperture extends between at least two edges of the respective arms.

4. The line strainer of claim 1, including one or more reinforcing ribs along the length of the unitary body.

5. The line strainer of claim 4, wherein the surface of the unitary body is ramped between a base level and a top level of at least one of the reinforcing ribs.

6. The line strainer of claim 5, wherein the ramping is located along an upper edge of one of the one or more reinforcing ribs.

7. The line strainer of claim 4, wherein the strainer includes at least one drainage hole positioned between two of the reinforcing ribs, the drainage hole passing through the body.

8. The line strainer of claim 4, wherein the one or more reinforcing ribs extend along the unitary body between the spool mounting element and the line bearing support member in an orientation substantially parallel to one or more of:
   (i) a longitudinal axis of the unitary body; and/or
   (ii) a tensile axis of the unitary body.

9. The line strainer of claim 1, wherein the peripheral edges of the arms are reinforced.

10. The line strainer of claim 1, wherein the wall thickness of the unitary body is between 2.5 mm to 6 mm.

11. The line strainer of claim 1, wherein the unitary body includes a shield located between the curved support surface of the line bearing support member and the space between the arms, wherein the shield and the line bearing support member define a passage through which the second line is to be passed.

12. The line strainer of claim 1, comprising an aperture passing through the unitary body at a point distal from the spool mounting element, with the material between the aperture and an end of the body forming the line bearing support member.

13. The line strainer of claim 1, wherein the distance between a surface of the line bearing support member against which the second line bears against in use to an element of the line strainer conductively connected to the first line is at least 32 millimeters.

14. The line strainer of claim 1, including
   a securing mechanism at a first end of the electrically conductive spool, the securing mechanism configured to secure an electrically conductive link to an electrically conductive connection to the electrically conductive spool.

15. The line strainer of claim 1, wherein the pawl includes a sprung member integral with the unitary body, and a spool engaging member connected to the sprung member for engaging with the spool.

16. The line strainer of claim 15, wherein the pawl includes a releasable catch adapted to selectively hold the sprung member in a position away from the spool.

17. The line strainer of claim 16, wherein the releasable catch includes a protrusion having a lip on which a catch surface of the sprung member is seated, until the releasable catch is withdrawn or the sprung member pushed forward.

18. The line strainer of claim 1, including at least one link restraint.

19. The line strainer of claim 18, wherein the at least one link restraint is one or more of:
   (i) a projection extending from the body; or
   (ii) a plurality of link restraint projections, spaced apart to receive conductive links therebetween and hold them in place.

20. The line strainer of claim 19, wherein the plurality of link restraint projections includes a primary link restraint projection and a secondary link restraint projection, spaced apart such that a conductive link may be positioned between them.

21. The line strainer of claim 18, wherein the link restraint is configured to be releasably attached to at least one attachment point of the body.

22. A method of connecting and tensioning a first line and a second line of a fence line, including the steps of:
   attaching first ends of the first line and the second line to respective anchoring points;
   attaching a second end of the first line to a spool of a line strainer of claim 1;
   attaching a second end of the second line to a line bearing support member of the line strainer; and
   rotating the spool of the line strainer to tension the first line and the second line.

23. A fence system, including:
   a first line and a second line, each having a first end and a second end, attached at their first ends to respective anchoring points;
   a line strainer of claim 1,
   wherein the second end of the first line is attached to a spool of the line strainer, and the second end of the second line is attached to a line bearing support member of the line strainer.

* * * * *